United States Patent

Engels et al.

Patent Number: 5,205,710
Date of Patent: Apr. 27, 1993

[54] HELICOPTER BLADE CRACK DETECTION SYSTEM

[75] Inventors: Geoffrey P. Engels; Mark C. Thomas, both of Warner Robins, Ga.

[73] Assignee: The United States of America as represented by the Secretary of the Air Force, Washington, D.C.

[21] Appl. No.: 680,458

[22] Filed: Apr. 4, 1991

[51] Int. Cl.$^5$ ................................ B63H 1/00
[52] U.S. Cl. .................... 416/61; 416/232; 73/178 H; 244/17.11; 340/946
[58] Field of Search .............. 416/61, 232, 158; 73/40, 178 H; 340/963, 946; 250/551; 224/17.11, 17.13

[56] References Cited

U.S. PATENT DOCUMENTS

| | | | |
|---|---|---|---|
| 3,547,555 | 12/1970 | Jensen | 416/61 |
| 3,739,376 | 6/1973 | Keledy | 416/61 X |
| 3,801,837 | 4/1974 | Pease et al. | 250/551 X |
| 3,985,318 | 10/1976 | Dominey et al. | 244/17.11 |
| 4,026,660 | 5/1977 | Ueda et al. | 416/61 |
| 4,106,332 | 8/1978 | McKeown | 73/104 |
| 4,109,998 | 8/1978 | Iverson | 250/551 |
| 4,345,237 | 8/1982 | Lerche et al. | 340/27 R |
| 4,492,427 | 1/1985 | Lewis et al. | 250/551 X |
| 4,524,620 | 6/1985 | Wright et al. | 73/587 |
| 4,534,704 | 8/1985 | McArdle | 416/158 |
| 4,717,907 | 1/1988 | Troy | 416/61 X |
| 4,727,251 | 2/1988 | Blincow et al. | 250/308 |

OTHER PUBLICATIONS

EMC Technology & Interference Control News, vol. 5, No. 2, Mar.-Apr. 1986, pp. 55-62.
Grounding for the Control of EMI, Hugh W. Denny, 1988, pp. 1.1-3.10.

*Primary Examiner*—Edward K. Look
*Assistant Examiner*—Todd Mattingly
*Attorney, Agent, or Firm*—Stanton E. Collier; Donald J. Singer

[57] ABSTRACT

The invention is a helicopter blade crack detection system for blades that are hollow and pressurized or evacuated to a low pressure A rotating assembly having a rotating indicator assembly photo-optically communicates to an airframe detection assembly providing high reliability, ease of maintenance, and EMI secured.

3 Claims, 3 Drawing Sheets

HELICOPTER BLADE CRACK DETECTION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates to helicopters, and, in particular, relates to a system for detecting cracks in helicopter blades that have hollow spars and are either pressurized or have a vacuum therein.

Helicopter blades are very long and slender as compared to typical aircraft blades and are thus subject to severe stress from flexing, bending, twisting, etc. which considerably shortens the blade's life from fatigue. Hollow blades being lighter are subject to greater stress because they are typically used on military helicopters which are more prone to violent maneuvers. It is clearly obvious that any pending failure in the blade evidenced by cracks should be detected as soon as possible to prevent catastrophic failure.

X-ray pictures and magnetic flux preventive maintenance procedures can be performed after so many designated hours of use; however, x-rays will not detect a crack less than about half an inch and magnetic flux will not work on non-magnetic materials such as aluminum and titanium, for example. Therefore, the pressurized or evacuated spar is used to detect cracks by means of a differential pressure change in the hollow spar.

In order to detect cracks in rotor blades before failure several prior systems have been used.

One prior system called the Blade Inspection Method (BIM) uses pressure switches in each blade that indicate if the pressure within the spar falls below a preset level A signal from the rotating switch is transferred through a set of slip rings attached at the base of the rotor shaft to a warning lamp in the cockpit. One problem occurred when the blade stopped rotating then the pressure switch would return to its normal state as a result of the air pressure equalizing in the blade. Another problem occurs in the slip rings. The slip rings become worn and dirty and may not pass a critical signal with any reliability.

This system has been replaced in many helicopters by the Inflight Blade Inspection System (IBIS) In this system, the pressure sensor device, when activated by a gas pressure change, exposed a radioactive source such as Sr-90 to the atmosphere. The radiation is detected by a Geiger-Mueller tube assembly that is mounted on the airframe near the rotating blades. See, for example, U.S. Pat. Nos. 3,985,318 and 4,727,251 which are incorporated by reference. This system is not resistant to electromagnetic interference (EMI) and results in false alarms when the helicopter is flown near radars. Retrofit for EMI hardening is very expensive. Also, the nuclear isotopes must be replaced at about 10 years which is also expensive for a large fleet. The use of nuclear material further requires special handling, permits, licensing, shipping, repairs and disposal procedures, all time consuming and expensive.

Other prior systems use an induction coil or a conductive wire, or pressure sensitive transducer, for example, to detect cracks. This information is transmitted to the aircraft by, for example, inductive coil coupling. U.S. Pat. Nos. 4,026,660; 4,106,332; 4,345,237 and 4,524,620 are incorporated by reference.

Therefore, there is a need for a crack detection system that is reliable, easily maintained, inexpensive and can be retrofitted into existing blades without modification thereto.

SUMMARY OF THE INVENTION

The present invention provides a crack detection system for hollow, pressurized or evacuated helicopter spars in the blades.

Mounted on each blade of the helicopter rotor-blade assembly is a rotating indicator assembly which consists of a pressure sensor which actuates a physical indicator and a resetable switch, normally open, which closes when the gas pressure changes a predetermined amount. When the switch closes d.c current flows through a light emitter. This light emitter may emit in any desired wavelength such as infrared, visible, or ultraviolet. A test switch and test lamp are also included. The rotating indicator assembly is mounted on each blade while the remaining components of the rotating assembly such as a battery, the test lamp, test switch and the container can be mounted to the rotor head with the light emitter mounted in the base of the hollow rotor shaft.

An airframe detection assembly being non-rotating, provides the pilot with an indicator lamp of the degraded blade condition, a means of resetting that lamp, and a test switch. Mounted in very close proximity to the light emitter of the rotating detection assembly is a photo-optic detector which, upon receiving the light, triggers a SCR device to operate the indicator lamp.

Therefore, one object of the present invention is to provide a helicopter blade crack detection system having very high reliability.

Another object of the present invention is to provide a crack detection system that operates with optronics between the rotating assembly and the airframe detection assembly.

Another object of the present invention is to provide a crack detection system that is totally maintained at the lowest level of maintenance.

Another object of the present invention is to provide a crack detection system that is inherently resistant to EMI by using only d.c. voltages and currents of a relatively high level that cannot be induced externally and by routing the wiring inside the hollow rotor shaft and inside the airframe.

These and many other objects and advantages of the present invention will be readily apparent to one skilled in the pertinent art from the following detailed description of a preferred embodiment of the invention and the related drawings.

DESCRIPTION OF THE PREFERRED EMBODIMENT

Figure 4:
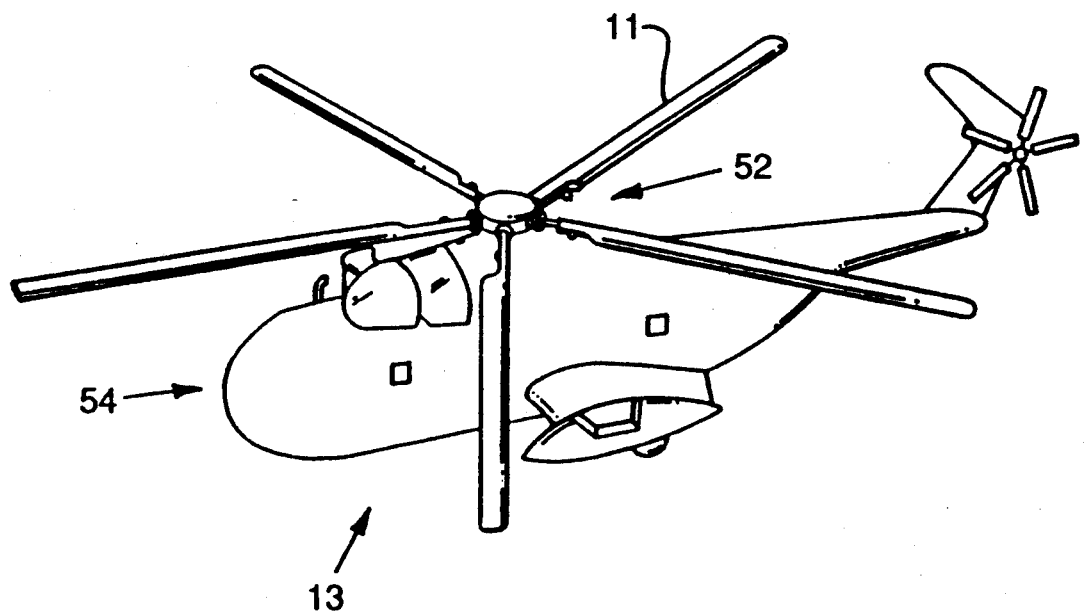
FIG. 4 illustrates a helicopter.

A helicopter 13 is shown in FIG. 4 with a plurality of blades 11.

Figure 1:
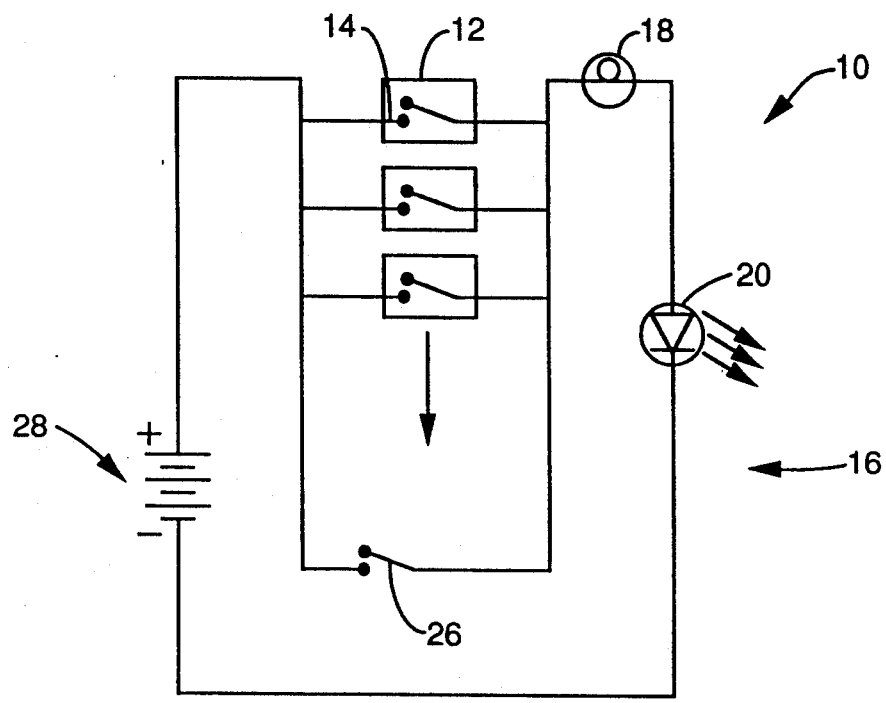
FIG. 1 illustrates schematically a rotating assembly having a rotating indicator assembly that is attached to the helicopter rotor shaft-blade assembly.

A helicopter blade crack detection system 10 is partially shown in FIG. 1. The present invention is particularly directed at helicopter spars that are hollow and pressurized or evacuated to a low pressure.

Figure 3:
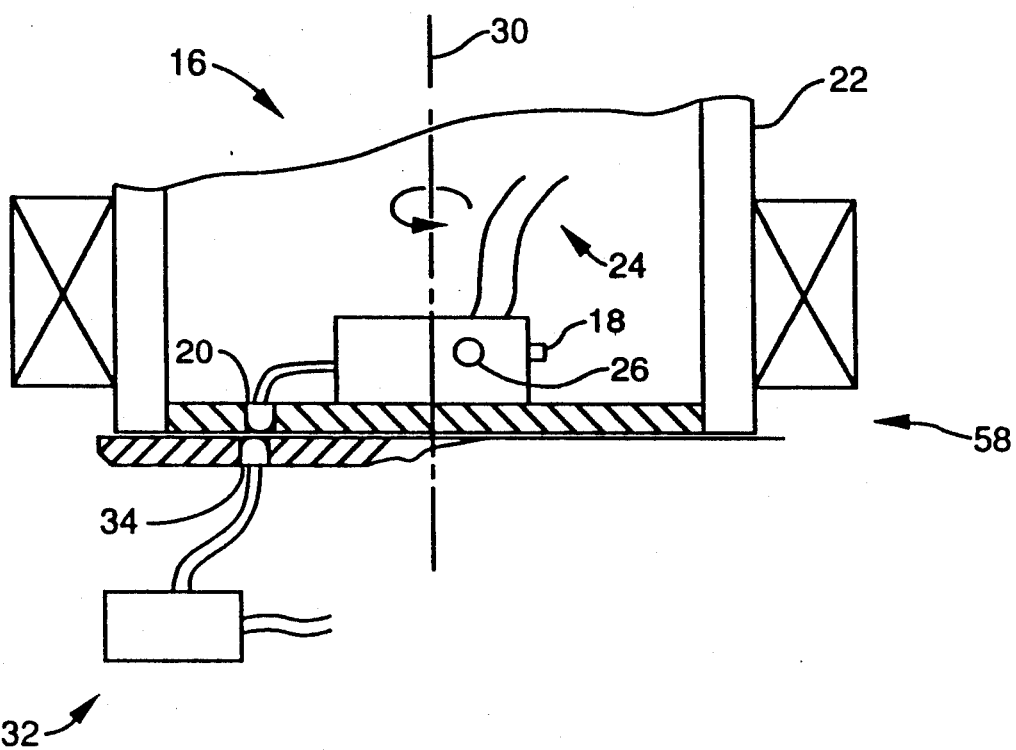
FIG. 3 illustrates schematically the manner of photo-optically coupling of the rotating assembly to the airframe detection assembly.

As noted above, the detection of cracks in the blades is necessary to prevent catastrophic failure. On each blade 11, FIG. 4 is attached a rotating indicator assembly 12, schematically shown in FIG. 1, being a part of a rotating assembly 16, which reacts when the pressure in the blade changes a predetermined level. There is one rotating indicator assembly 12 for each blade. At this time, a visual indicator, not shown, appears on the indicator assembly 12 and a resetable switch 14 closes and latches. Upon closing, d.c. current flows in a circuit causing a lamp 18 and a light emitter 20 to function and emit infrared energy, for example, as in this invention. The rotating assembly 16 may be mounted in the bottom of the hollow rotor shaft 22, for example, in FIG. 3, with wires 24 being attached to the indicator assemblies 12 on the blades. A testing switch 26 being in parallel with the indicator assembly 12 acts to test a battery 28, the lamp 18 and the light emitter 20 as well as the connecting wires. This independent test circuit is required since, normally, the rotating frame communicates only periodically with the fixed frame and thus when the blades are not rotating, there may be no communications at that time. This will be further explained hereinafter. After one of the indicator assemblies 12 actuates, the switch 14 must be manually reset This prevents the indicator assembly 12 from clearing itself automatically after the rotor stops turning when the pressure may increase at the inner end of the blade. As seen in FIG. 3, the light emitter 20 is shown mounted perpendicular to an axis 30 and may turn with the rotor shaft 22, if not centered therein. Referring to FIG. 3, it is seen therein that the emitter 20 and a detector 34 are mounted off-axis of the rotor shaft 22 and that as a result, the communications therebetween is only periodic and only a fraction of the rotation period.

Figure 2:
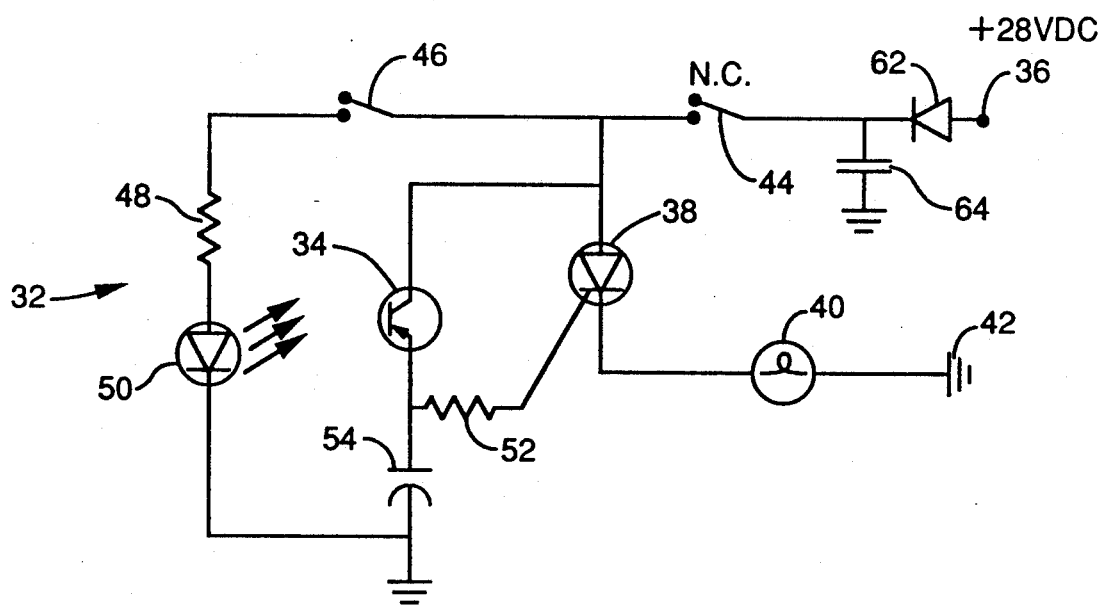
FIG. 2 illustrates schematically an airframe detection assembly of the present invention.
Figure 5:
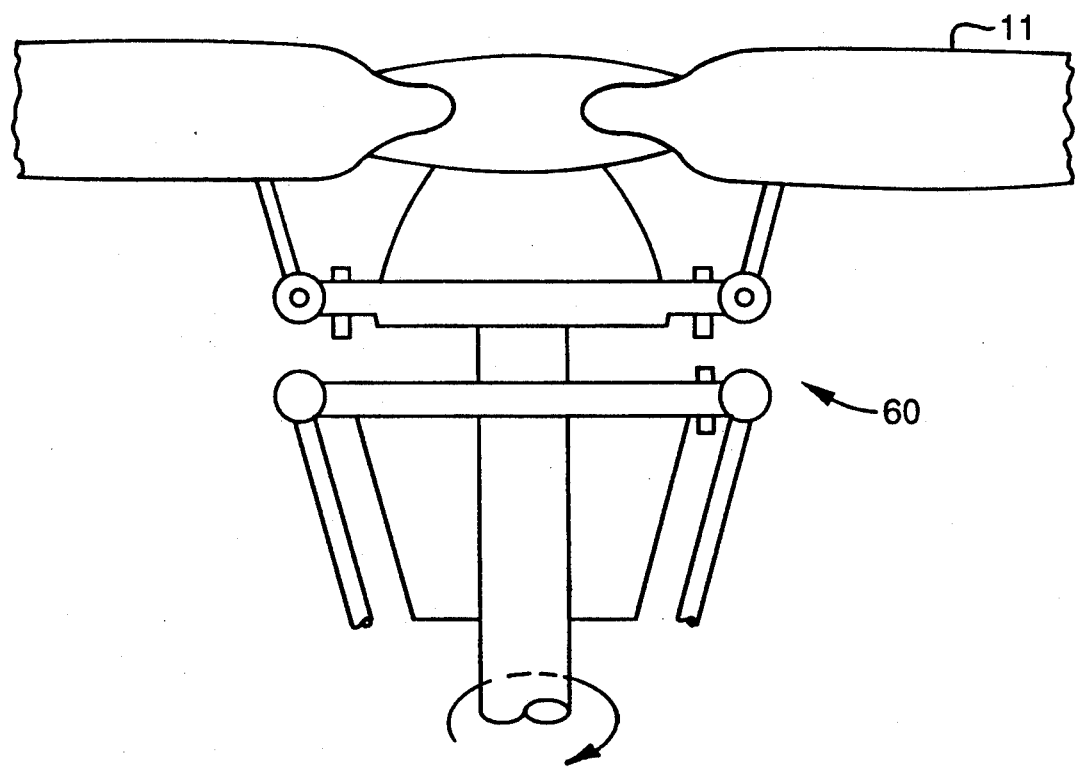
FIG. 5 illustrates a stationary-to-rotating swashplate interface.

In order to transfer information from a rotating frame 52 to a fixed airframe 54 of the helicopter 13, an airframe detection assembly 32, FIG. 2, and shown schematically in FIG. 3, alerts the pilot to blade cracks. To prevent false alarms and degradation from dirt, grease, etc., the photo-optic detector (infrared transistor sensor) 34 is mounted in very close proximity, in the range of several thousandths to 0.020 inches from the light emitter 20 of the rotating assembly 16. This closeness insures a high reliability in the transfer of information therebetween. Another location to mount the photo-optic interface if the rotor shaft is not hollow would be at the rotating-to-stationary swashplate interface 60 as seen in FIG. 5.

Referring to FIG. 2, an appropriate aircraft d.c. voltage is applied at point 36 and if a SCR (silicon controlled rectifier) 38 is triggered, the current flowing therethrough will illuminate a lamp 40 and then to a ground 42. A diode 62 and a capacitor 64 in the power source circuit prevent erroneous signals occurring if there is a surge or spike in the power supply at point 36. The lamp 40 would be mounted in the cockpit along with a reset switch (normal closed) 44 which when activated stops the SCR 38. Upon detection of a crack, the light emitter 20 irradiates the light photo-optic detector 34, together with a capacitor 54 and a resistor 52, to initiate current flow in the SCR 38. A test circuit for checking the airframe detection assembly 32 includes a test switch 46, a resistor 48, and an light emitter 50.

The EMI hardening is accomplished by placing the rotating assembly within the rotor base 58 as shown in FIG. 3, using d.c. currents of several volts, and shielding of the connecting wires. Metal containers would be used to protect components where necessary. Clearly, many modifications and variations of the present invention are possible in light of the above teachings and it is therefore understood, that within the inventive scope of the inventive concept, the invention may be practiced otherwise than specifically claimed.

We claim:

1. A crack detection system for a helicopter having hollow spars in blades that are either pressurized or evacuated to a low pressure, said crack detection system comprising:

rotating assembly means mounted on a helicopter rotor shaft-blade apparatus for detecting and indicating a crack in each of the blades;

means mounted on a helicopter airframe for warning a pilot of the crack; and said rotating assembly means for detecting and indicating and said means for warning being in periodic photo-optic communications, said communications being between a light emitter of said means for detecting and a photo-optic detector of said means for warning located within a few thousands of an inch of each other.

2. A crack detection system for a helicopter having hollow spars in blades that are either pressurized or evacuated to a low pressure, said crack detection system comprising:

rotating assembly means mounted on a helicopter rotor shaft-blade apparatus for detecting and indicating a crack in each of the blades;

means mounted on a helicopter airframe for warning a pilot of the crack; and said rotating assembly means for detecting and indicating and said means for warning being in periodic photo-optic communications;

said means for warning comprising:

a source of power;

a resetable warning circuit, said resetable warning circuit including:

a resetable switch;

a silicon controlled rectifier, a trigger circuit being in parallel with said silicon controlled rectifier, and a warning lamp; and said trigger circuit for receiving light from a light emitter of said means for detecting, said trigger circuit including:

a photo-optic detector;

a capacitor to ground; and a resistor.

3. A crack detection system as defined in claim 2 further including a testing circuit in parallel with said trigger circuit.

* * * * *